United States Patent
Cornette et al.

(10) Patent No.: US 7,087,697 B2
(45) Date of Patent: Aug. 8, 2006

(54) CROSSLINKABLE POLYETHYLENE COMPOSITION

(75) Inventors: Martine Cornette, Zemst (BE); Laurent Lefebvre, Brussels (BE); Eric Vandevijver, Woluwe-Saint-Lambert (BE)

(73) Assignee: Solvay Polyolefins Europe-Belgium (Societe Anonyme), Brussels (BE)

( * ) Notice: Subject to any disclaimer, the term of this patent is extended or adjusted under 35 U.S.C. 154(b) by 168 days.

(21) Appl. No.: 10/181,777

(22) PCT Filed: Jan. 15, 2001

(86) PCT No.: PCT/EP01/00424

§ 371 (c)(1),
(2), (4) Date: Nov. 4, 2002

(87) PCT Pub. No.: WO01/53367

PCT Pub. Date: Jul. 26, 2001

(65) Prior Publication Data

US 2005/0031813 A1    Feb. 10, 2005

(30) Foreign Application Priority Data

Jan. 21, 2000    (BE) ................. 2000/0046

(51) Int. Cl.
*C08F 110/02* (2006.01)
(52) U.S. Cl. ............... 526/352; 526/279; 428/35.7
(58) Field of Classification Search ............ 525/326.5, 525/100; 526/352, 279, 227; 428/35.7
See application file for complete search history.

(56) References Cited

U.S. PATENT DOCUMENTS

| 3,646,155 | A | | 2/1972 | Scott | |
|---|---|---|---|---|---|
| 5,859,076 | A | * | 1/1999 | Kozma et al. | 521/79 |
| 5,883,144 | A | * | 3/1999 | Bambara et al. | 521/144 |
| 6,465,107 | B1 | * | 10/2002 | Kelly | 428/447 |

FOREIGN PATENT DOCUMENTS

GB    1 450 943    9/1976

\* cited by examiner

*Primary Examiner*—Ling-Sui Choi
(74) *Attorney, Agent, or Firm*—Nixon & Vanderhye

(57) ABSTRACT

Composition based on a crosslinkable polyethylene comprising from 0.05 to 0.24 hydrolysable silane groups per 100 —$CH_2$— units and having a standard density SD of at least 954 kg/m$^3$ and a melt flow index $MI_5$ of less than 1.5 g/10 min. Pipes for the transportation of fluids under pressure, which can be obtained by extruding this composition and then hydrolysing it.

6 Claims, No Drawings

CROSSLINKABLE POLYETHYLENE COMPOSITION

The present invention relates to a composition based on a crosslinkable polyethylene. It relates more particularly to a composition based on a polyethylene comprising hydrolysable silane groups. The invention also relates to a process for obtaining pipes from this composition, as well as to the pipes that can thus be obtained.

It is known that polyethylene comprising hydrolysable silane groups can be crosslinked by the action of water. U.S. Pat. No. 3,646,155 describes a process for obtaining a composition of a crosslinkable polyethylene by extruding a blend of polyethylene, a peroxide and a vinylalkoxysilane. This composition is then mixed with a composition comprising a condensation catalyst and formed and then crosslinked by exposure to moisture.

Moreover, it is known that compositions comprising a crosslinkable polyethylene can be used for the manufacture of pipes, more particularly pipes intended for the transportation of hot water. The polyethylenes used for this purpose are generally ethylene copolymers which have a relatively low specific density. They generally have a relatively high melt flow index. The pipes obtained from these polyethylenes have the drawback of not withstanding a high pressure. They therefore cannot be used for the transportation of fluids under high pressure.

The present invention aims to provide a crosslinkable polyethylene composition which does not have the aforementioned drawbacks and which makes it possible to manufacture pipes that can be used for transportation of fluids under high pressure.

The invention therefore relates to a composition based on a crosslinkable polyethylene comprising from 0.05 to 0.24 hydrolysable silane groups per 100 —$CH_2$— units and having a standard density SD of at least 954 kg/m³, a melt flow index $MI_5$ of less than 1.5 g/10 min and a melt flow index HLMI of greater than 2 g/10 min.

The crosslinkable polyethylene according to the present invention is a polymer comprising hydrolysable silane groups. The term "hydrolysable silane groups" is understood to mean groups of the Si—OR type which, after hydrolysis by water, are capable of forming Si—O—Si links between various polyethylene chains.

In the present invention, the content of hydrolysable groups of the crosslinkable polyethylene is expressed as the number of hydrolysable silane groups per 100 —$CH_2$— units present. This content may be determined by FT-IR (Fourier Transform Infrared) spectroscopic analysis. Within the context of the present invention, the content of hydrolysable groups is determined by NMR.

The crosslinkable polyethylene according to the present invention preferably contains at least 0.1 hydrolysable silane groups per 100 —$CH_2$— units. The content of hydrolysable silane groups preferably does not exceed 0.22 per 100 —$CH_2$— units. The content of hydrolysable silane groups of the crosslinkable polyethylene according to the present invention is preferably fixed so as to obtain, after hydrolysis, a crosslinked polyethylene having a degree of crosslinking of at least 65%, preferably at least 69%, by weight. The degree of crosslinking is defined as being the fraction of the crosslinked polyethylene insoluble in hot silane, measured according to the ISO/DIS 10147 standard (extraction for eight hours at the boiling point of xylene). In general, the degree of crosslinking does not exceed 85% by weight. Preferably, the degree of crosslinking does not exceed 80% by weight.

In the present invention, the melt flow indices $MI_2$, $MI_5$ and HLMI are measured according to the ASTM D 1238 (procedure B) standard, under a load of 2.16 kg, 5 kg and 21.6 kg respectively. The crosslinkable polyethylene according to the present invention preferably has a melt flow index $MI_5$ which does not exceed 1.4 g/10 min. The crosslinkable polyethylene according to the present invention preferably has a melt flow index $MI_5$ of at least 0.1 g/10 min. Particularly preferred is a crosslinkable polyethylene having an $MI_5$ of at least 0.2 g/10 min. The crosslinkable polyethylene according to the present invention preferably has a melt flow index HLMI of at least 5 g/10 min, more particularly at least 10 g/10 min. The melt flow index HLMI generally does not exceed 100 g/10 min. Preferably, the HLMI does not exceed 50 g/10 min. The crosslinkable polyethylene usually has an $MI_2$ of less than 0.8 g/10 min, preferably less than 0.5 g/10 min. Its melt flow index $MI_2$ is generally greater than 0.03 g/10 min, preferably greater than 0.05 g/10 min. It has been found that when the melt flow index $MI_5$ of the crosslinkable polyethylene is greater than 1.5 g/10 min, it is difficult to extrude a tube with a constant thickness because of the sagging phenomenon (i.e. flow under gravity of the tube in the melt). Moreover, it has been found that when the melt flow index HLMI of the crosslinkable polyethylene is less than 2 g/10 min, the composition is not suitable for manufacturing pipes having an acceptable appearance and acceptable properties.

In the present invention, the standard density SD is measured according to the ASTM D792-66 standard. The crosslinkable polyethylene preferably has an SD of at least 955 kg/m³. The SD of the crosslinkable polyethylene generally does not exceed 962 kg/m³, preferably does not exceed 960 kg/m³.

Good results have been obtained with a composition based on a crosslinkable polyethylene obtained by grafting a base polyethylene by means of a compound comprising hydrolysable silane groups. The composition according to the invention is preferably obtained by the melt blending of a base polyethylene having an SD of at least 956 kg/m³, an $MI_2$ of greater than 0.15 g/10 min and an $MI_5$ of less than 10 g/10 min with from 1.0 to 2.5 parts (by weight) per 100 parts (by weight) of base polyethylene of a vinylsilane and from 0.04 to 0.15 part (by weight) per 100 parts (by weight) of base polyethylene of a compound capable of generating free radicals.

The base polyethylene used in the process for obtaining the composition according to the invention preferably has an SD of at least 958 kg/m³ and not exceeding 970 kg/m³. Good results have been obtained with a base polyethylene having an SD of at least 960 kg/m³. The base polyethylene may be an ethylene homopolymer or a copolymer of ethylene with small amounts of another monomer, such as especially butene or hexene. Preferably, it is an ethylene homopolymer.

The base polyethylene preferably has a melt flow index $MI_5$ of at least 0.5 g/10 min and not exceeding 8 g/10 min. Good results have been obtained with a base polyethylene having a melt flow index $MI_5$ not exceeding 6 g/10 min. Particularly preferred is a base polyethylene having a melt flow index $MI_5$ of at least 1.0 g/10 min. The base polyethylene usually has an $MI_2$ of less than 4 g/10 min, preferably less than 2 g/10 min. Its melt flow index $MI_2$ is generally greater than 0.16 g/10 min, preferably greater than 0.2 g/10 min.

The term "vinylsilane" is understood to mean a silane comprising at least one vinyl functional group. The vinylsilane used in the process for obtaining the composition according to the invention is usually a vinylsilane satisfying the general formula $R^1R^2R^3SiY$, in which Y denotes a hydrocarbon radical comprising at least one vinyl functional group, $R^1$ denotes a hydrolysable group and $R^2$ and $R^3$ denote, independently, an alkyl group or a hydrolysable group $R^1$. The hydrolysable group $R^1$ may be chosen from radicals of the alkoxy, acyloxy, oxime and amine type. $R^1$ is preferably an alkoxy radical containing from 1 to 6 carbon atoms. It is preferred to use a vinylsilane in which $R^2$ and $R^3$ are also hydrolysable groups as defined above. Good results have been obtained with vinyltrialkoxysilanes in which the alkoxy groups each contained from 1 to 4 carbon atoms. Particularly preferred are vinyltriethoxysilane and vinyltrimethoxysilane.

The amount of vinylsilane used in the process for obtaining the composition according to the invention is preferably at least 1.5 part per 100 parts of base polyethylene. Preferably, the amount of vinylsilane used does not exceed 2.4 parts per 100 parts of base polyethylene.

The expression "compound capable of generating free radicals" is understood to mean any compound which can generate free radicals in the base polyethylene under the operating conditions. The compound capable of generating free radicals used in the process for obtaining the composition according to the present invention is usually chosen from organic peroxides, peresters and diazo compounds. Organic peroxides are preferred. Good results have been obtained with alkylperoxides such as, especially, 2,5-dimethyl-2,5-di(tert-butylperoxy)hexane and 3,6,9-triethyl-3,6,9-trimethyl-1,4,7-triperoxonane.

The amount of compound capable of generating free radicals which is used in the process for obtaining the composition according to the invention is preferably at least 0.045 part per 100 parts of base polyethylene. Preferably, the amount used does not exceed 0.12 part per 100 parts of base polyethylene.

The melt blending is usually carried out at a temperature of between 140 and 300° C., preferably between 150 and 250° C. The mixing time usually varies from 2 seconds to 10 minutes. The melt blending of the base polyethylene, the vinylsilane and the compound capable of generating free radicals may be carried out in any device known for this purpose, such as internal or external mixers. The mixing is preferably carried out in a continuous mixer, more particularly in an extruder.

The composition according to the invention is generally in the form of granules obtained, in a known manner, by cutting the rods output by an extruder into granules. The composition according to the invention may also be in the form of powders obtained by grinding or micronizing the granules.

The composition according to the invention preferably contains at least 95% by weight of crosslinkable polyethylene. Particularly preferred is a composition comprising at least 99% by weight, and even more particularly at least 99.7% by weight, of crosslinkable polyethylene. The composition according to the invention may contain, in addition to the crosslinkable polyethylene, other additives usually present in polyolefin compositions. The composition according to the invention preferably contains only a small amount of additives, more particular an antioxidant. Preferably it contains less than 0.3% by weight of an antioxidant.

The compositions according to the invention are preferably kept away from moisture until their use.

The compositions according to the invention are suitable for being used in conventional processes for forming articles and more particularly using extrusion processes. The invention consequently also relates to a process for manufacturing a formed article in which, in a first step, a composition based on a crosslinkable polyethylene according to the invention is formed into the shape of an article and then, in a second step, the article from the first step undergoes a hydrolysis so as to crosslink the crosslinkable polyethylene.

The compositions according to the invention are particularly well suited for extruding pipes, especially pipes for transportation of fluids under pressure, such as water and gas.

The invention consequently also relates to a process for manufacturing a pipe in which, in a first step, a composition based on a crosslinkable polyethylene according to the invention is extruded in the form of a pipe and then, in a second step, the pipe from the first step undergoes a hydrolysis so as to crosslink the crosslinkable polyethylene.

In the first step of the process for manufacturing a pipe according to the invention, the extrusion may be carried out under the usual conditions for extruding polyethylene pipes. The manufacture of pipes by extruding a composition according to the invention is advantageously carried out on an extrusion line comprising an extruder fitted with a helical head, a sizing unit and a haul-off device. The extrusion is generally carried out in a single-screw extruder at a temperature of 150 to 230° C. The sizing of the pipes may be carried out by creating a partial vacuum outside the pipe and/or by creating an overpressure inside the pipe.

In the first step of the process, the composition is advantageously used in the presence of a crosslinking catalyst. The term "crosslinking catalyst" is understood to mean any catalyst which makes it possible to accelerate the crosslinking of the crosslinkable polyethylene when it undergoes a hydrolysis. The crosslinking catalyst is usually chosen from metal carboxylates, organometallic compounds, organic bases and acids.

The catalyst is preferably chosen from metal carboxylates and more particularly from lead, cobalt, iron, nickel, zinc and tin carboxylates. Organic and inorganic tin carboxylates are particularly preferred. Good results have been obtained with dialkyltin carboxylates and more particularly with dibutyltin dilaurate. The amount of crosslinking catalyst added to the composition according to the invention during the first step of the manufacturing process is generally between 0.12 and 0.47 mol per 100 mol of hydrolysable silane groups present in the crosslinkable polyethylene. This amount is preferably at least 0.13 mol per 100 mol. Preferably, it does not exceed 0.33 mol per 100 mol of hydrolysable silane groups present in the crosslinkable polyethylene.

The crosslinking catalyst is advantageously added to the composition according to the invention in the form of a masterbatch. This masterbatch usually contains from 0.2 to 0.52% by weight of crosslinking catalyst, the balance consisting of polyethylene. This polyethylene preferably has the same characteristics of the base polyethylene as described above.

It goes without saying that, in the first step of the process for manufacturing a pipe, the usual processing additives for polyolefins, such as stabilizers (antioxidants and/or UV stabilizers), antistatic agents and processing aids, together with pigments, may also be mixed into the compositions according to the invention. These additives may be mixed with the composition according to the invention separately or they may form part of a masterbatch. According to a variant of the manufacturing process, the additives described above form part of the masterbatch comprising the crosslinking catalyst. The amount of processing additives does not in general exceed 5 parts (by weight) per 100 parts of composition according to the invention used. It preferably does not exceed 3 parts. The amount of additives is usually at least 0.3 part per 100 parts of composition. According to another variant of the process for manufacturing a pipe, the compositions according to the invention are mixed with a small amount of a nucleating agent, preferably with talc. The amount of nucleating agent or talc used does not in general exceed 1 part by weight per 100 parts of composition. The addition of a nucleating agent or talc to the composition may be done separately or via the addition of a masterbatch, especially by the addition to the masterbatch comprising the crosslinking catalyst. The addition of a nucleating agent, particularly talc, to the composition makes it possible to improve the long-term pressure resistance of the pipes.

According to one particular method of implementing the process for manufacturing a pipe according to the invention, the composition based on a crosslinkable polyethylene is manufactured in situ during the first step of the process, that is to say the extrusion of a pipe. For this purpose, a blend comprising a base polyethylene, a vinylsilane and a compound capable of generating free radicals and, where appropriate, a crosslinking catalyst and/or other additives, is extruded in the form of a pipe during the first step of the process for manufacturing a pipe.

In the second step of the process for manufacturing a pipe according to the invention, the pipe from the first step undergoes a hydrolysis so as to crosslink the crosslinkable polyethylene. The hydrolysis is usually carried out in the presence of water. In general, the hydrolysis is carried out by exposing the pipe to water, steam or moisture at a temperature of from 10 to 150° C. The optimum exposure time varies depending on the temperature and the thickness of the pipe and is generally between a few minutes and a few days.

The hydrolysis may be carried out by keeping the pipe for a few days under ambient temperature and humidity conditions. The hydrolysis is preferably carried out by placing the pipe from the first step in an atmosphere containing water vapour at a temperature of 60 to 130° C. or in the presence of hot water, maintained at a temperature of 60 to 100° C. If the pipe is placed in an atmosphere containing water vapour, the treatment is typically carried out for a period of at least one hour. In this case, the treatment time generally does not exceed a few weeks.

If the pipe is placed in the presence of hot water, the treatment time is generally from at least one hour to a few weeks. It goes without saying that it is possible to carry out the second step of the process according to the invention after installing the pipe. In this case, it is possible to weld the pipes to one another by conventional methods of welding uncrosslinked polyethylene pipes. After welding and/or installation, the second step of the process can then be carried out by making steam or hot water flow through the pipes, as described above.

After the second step of the manufacturing process, a pipe is generally obtained which comprises a crosslinked polyethylene having a degree of crosslinking, as defined above, of at least 65%, preferably of at least 70%, by weight. In general, the degree of crosslinking does not exceed 85% by weight. Preferably, the degree of crosslinking does not exceed 80%.

The manufacturing process according to the invention makes it possible to obtain pipes having an SD of greater than 950 kg/m$^3$ or even greater than 953 kg/m$^3$.

The process can be applied to the manufacture of pipes of very variable size and of diameters ranging from a few mm to a few dm. The process according to the invention can be applied to the manufacture of crosslinked polyethylene pipes of large thickness, especially a thickness greater than or equal to 1 cm.

The pipes obtained by the manufacturing process according to the invention are characterized by a good resistance to environment stress cracking (ESCR), corresponding to a fracture time, as measured according to the method described in the ISO F/DIS 13479 (1996) standard [at 80° C., on a notched pipe having a diameter of 110 mm and thickness of 10 mm and under a stress of 5.4 MPa] of generally greater than 5 000 hours, or indeed greater than 10 000 hours or even greater than 15 000 hours.

The pipes obtained by the manufacturing process according to the invention are also characterized by good resistance to rapid crack propagation (RCP), corresponding to crack propagation arrest at an internal pressure generally at least equal to 12 bar, as measured, at −30° C., on a pipe having a diameter of 110 mm and a thickness of 10 mm according to method S4 described in the ISO F/DIS 13477 (1996) standard.

The pipes obtained by the manufacturing process according to the invention are also characterized:

by good pressure resistance, corresponding to a failure time generally greater than 1 000 hours, as measured, at 20° C., on a pipe having a diameter of 32 mm and a thickness of 3 mm, and under a stress of 13.6 MPa according to the ISO 1167 standard;

good thermal stability, corresponding to a failure time generally greater than 15 000 hours, as measured by a pressure test under a stress of 2.8 MPa at 110° C., according to the ISO 1167 standard;

good resistance to gas condensates, corresponding to a failure time generally greater than 1 000 hours, as measured at 80° C., on a pipe having a diameter of 32 mm and a thickness of 3 mm, filled with a mixture of synthetic gas condensates (containing 50% n-decane and 50% trimethylbenzene), under a stress of 2 MPa according to the method described in the EN 921 standard;

good chemical resistance; and good abrasion resistance.

The pipes obtained by the manufacturing process according to the invention have a long-term pressure resistance which allows them to be assigned an MRS classification greater than the MRS 10 classification according to the ISO/TR 9080 standard. The pipes obtained by the process have a pressure resistance which allows them to be assigned an MRS classification of 11.2, or even 12.5, according to the ISO/TR 9080 standard.

The invention therefore also relates to the pipes, more particularly the pipes for the transportation of fluids under pressure, which can be obtained by the manufacturing process according to the invention.

The invention also relates to a pipe based on a crosslinked polyethylene having an MRS classification according to the ISO/TR 9080 standard of 11.2.

The invention relates more particularly to a pipe based on a crosslinked polyethylene having an MRS classification according to the ISO/TR 9080 standard of 12.5.

The pipes according to the invention are consequently very suitable for the transportation of fluids under pressure, such as water and gas. They can be used over very wide temperature ranges, wider than for uncrosslinked polyethylene pipes. The pipes according to the invention can be used for the distribution of mains hot water and for the transportation of oil.

The pipes based on a crosslinked polyethylene according to the invention can be joined together by means of a coupling piece consisting of the composition based on a crosslinkable polyethylene according to the invention. For this purpose, the coupling piece is manufactured by extrusion, by injection moulding or by compression moulding using the composition based on a crosslinkable polyethylene according to the invention, and then stored away from moisture until its use. The coupling piece is advantageously firstly welded to the crosslinked pipe by one of the conventional welding processes and then exposed to moisture so as to be crosslinked.

The examples which follow are intended to illustrate the invention.

EXAMPLE 1

A composition based on a crosslinkable polyethylene was manufactured by extruding, in a twin-screw extruder with a temperature profile of 175 to 215° C., a blend of 100 parts of a base polyethylene having an $MI_5$ of 3 g/10 min, an $MI_2$ of 0.8 g/10 min and an SD of 961 kg/m³ with two parts of vinyltrimethoxy-silane and 0.09 part of 2,5-dimethyl-2,5-di (tert-butylperoxy)hexane.

The crosslinkable polyethylene composition grafted by hydrolysable silane groups thus obtained had an HLMI of 18 g/10 min, an $MI_5$ of 0.5 g/10 min, an $MI_2$<0.1 g/10 min and an SD of 955 kg/m³.

Next, 95 parts of this composition were mixed with 5 parts of a polyethylene-based masterbatch comprising 0.36% by weight of dibutyltin dilaurate and 9% by weight of antioxidants. This compound was extruded in the form of pipes in a single-screw extruder with a temperature profile of 175 to 190° C.

A pipe having a diameter of 50 mm and a thickness of 2.9 mm was in particular obtained. This pipe was crosslinked by immersing it for 64 hours in a water bath maintained at a temperature of 80° C.

This pipe obtained had:
a degree of crosslinking of 73%;
a failure time measured in a pressure test according to the ISO 1167 standard at 20° C. and under a stress of 13.6 MPa of greater than 3 500 hours;
a long-term pressure resistance determined on the basis of the regression curves obtained at 20, 95 and 110° C. according to the ISO/TR 9080 standard, which exceeds 12.5 MPa, thereby allowing this pipe to be assigned an MRS classification of 12.5;
resistance to environment stress cracking (ESCR) [measured according to the method described in the ISO F/DIS 13479 (1996) standard at 80° C. on a notched pipe having a diameter of 110 mm and a thickness of 10 mm and under a stress of 5.4 MPa] corresponding to a failure time exceeding 14 000 hours;
resistance to rapid crack propagation (RCP) [measured at −30° C. on a pipe having a diameter of 110 mm and a thickness of 10 mm according to method S4 described in the ISO F/DIS 13477 (1996) standard] corresponding to crack propagation arrest at an internal pressure greater than 12 bar.

The pipes obtained exhibited an excellent creep/ESCR/RCP compromise which makes them suitable for use in the manufacture of a system for distributing pressurized fluids.

EXAMPLE 2

A crosslinkable polyethylene composition was manufactured according to the method described in Example 1, but using 0.05 part of 2,5-dimethyl-2,5-di(tert-butylperoxy)hexane (instead of 0.09 part).

The composition based on a crosslinkable polyethylene thus obtained had an HLMI of 24 g/10 min, an $MI_5$ of 1.3 g/10 min and an SD of 956 kg/m³.

Pipes were manufactured by means of this composition according to the process described in Example 1. The pipes thus obtained had properties similar to those obtained in Example 1.

COMPARATIVE EXAMPLE 3

A crosslinkable polyethylene composition was manufactured according to the method described in Example 1, but using a base polyethylene having an SD of 950 kg/m³, an $MI_5$ of 1.3 g/10 min and an $MI_2$ of 0.2 g/10 min.

The composition based on a crosslinkable polyethylene thus obtained had an $MI_5$ of 0.2 g/10 min, an $MI_2$<0.1 g/10 min and an SD of 946 kg/m³.

Pipes were manufactured by means of this composition according to the process described in Example 1.

The pipes thus obtained had the following characteristics:
a failure time measured in a pressure test according to the ISO 1167 standard at 20° C. and under a stress of 13.6 MPa of about 100 hours;
a long-term pressure resistance determined on the basis of the regression curves obtained at 20, 95 and 110° C. according to the ISO/TR 9080 standard of less than 11.2 MPa.

The pipes obtained did not meet the characteristics allowing them to be assigned an MRS classification of 12.5 or of 11.2.

COMPARATIVE EXAMPLE 4

A crosslinkable polyethylene composition was manufactured according to the method described in Example 1 but using a base polyethylene having an SD of 960 kg/m³, an $MI_5$ of 0.5 g/10 min and an $MI_2$ of 0.15 g/10 min.

The composition based on a crosslinkable polyethylene thus obtained had an HLMI of 2 g/10 min, an $MI_5$<0.2 g/10 min, an $MI_2$<0.1 g/10 min and an SD of 955 kg/m³.

Attempts were made to manufacture pipes by means of this composition according to the process described in Example 1. Pipes having an acceptable appearance could not be manufactured. The only pipes that could be obtained with this composition did not have a constant thickness and had a very rough surface. Their mechanical properties were unsatisfactory for use for transporting fluids under pressure.

The invention claimed is:

1. A pipe based on a crosslinkable polyethylene comprising from 0.05 to 0.24 hydrolysable silane groups per 100 —$CH_2$— units and having a standard density SD of at least 954 kg/m³, a melt flow index $MI_5$ of less than 1.5 g/10 min and a melt flow index HLMI of greater than 2 g/10 min.

2. The pipe according to claim 1, wherein the crosslinkable polyethylene has a melt flow index $MI_2$ of less than 0.8 g/10 min and greater than 0.03 g/10 min.

3. The pipe according to claim 1, wherein the crosslinkable polyethylene has a content of hydrolysable silane groups such that, after hydrolysis, the crosslinked polyethylene has a degree of crosslinking of at least 65% by weight.

4. The pipe according to claim 1, wherein it is obtained by the melt blending of a base polyethylene having an SD of at least 956 kg/m$^3$, an MI$_2$ of greater than 0.15 g/10 min and an MI$_5$ of less than 10 g/10 min with from 1.0 to 2.5 parts per 100 parts of base polyethylene of a vinylsilane and from 0.04 to 0.15 part per 100 parts of base polyethylene of a compound capable of generating free radicals.

5. The pipe according to claim 4, wherein the base polyethylene has an SD of at least 958 kg/m$^3$.

6. The pipe according to claim 4, wherein the base polyethylene has a melt flow index MI$_2$ of less than 2 g/10 min and greater than 0.16 g/10 min.

* * * * *